Inventor
Paul A. Smith
Attorney
Victor J. Evans

Nov. 17, 1931.   P. A. SMITH   1,832,746
HAYRAKE
Filed Sept. 23, 1929   3 Sheets-Sheet 3

Inventor
Paul A. Smith
Attorney
Victor J. Evans

Patented Nov. 17, 1931

1,832,746

UNITED STATES PATENT OFFICE

PAUL A. SMITH, OF NOTUS, IDAHO

HAYRAKE

Application filed September 23, 1929. Serial No. 394,660.

This invention relates to harvesters and its general object is to provide a rake of the dumping type that includes tripping mechanism centrally disposed with respect to the axle shaft of the rake, and which is operated by said shaft, thereby insuring uniform tripping action, and irregularities in the ground will have no effect upon the tripping mechanism as it usually does in the wheel trip type of rakes, as in the wheel trip type, the trip hangs, on rough and irregular ground surfaces and causes a sidewalk jerking motion which is transferred to the operator and propelling means of the rake.

Another object of the invention is to provide a rake of the character set forth that includes adjustable means to limit the throw of the rake teeth carrying means.

A further object of the invention is to provide a rake that has its main operating parts centrally located and easy to reach for oiling and other purposes, such a feature resulting in long life and efficient operation.

A still further object of the invention is to provide a rake of the dumping type that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which.

Figure 1:
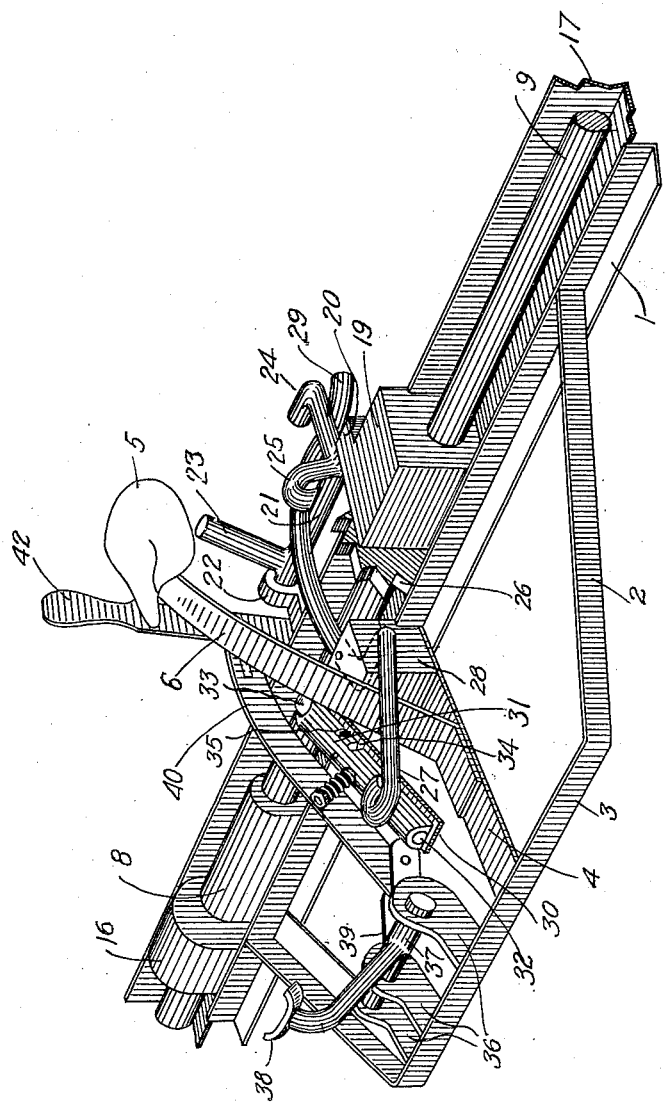
Figure 1 is a perspective view of my rake with parts broken away and the wheels and tongue eliminated.

Referring to the drawings in detail, it will be noted that the main frame includes an elongated angle bar 1 having formed therewith and extending forwardly in converging relation with respect to each other and from the vertical portion thereof are arms 2 formed with a bridging strip 3 at their forward ends as best shown in Figure 1. Centrally extending from the bridging strip 3 and having one end secured thereto and the horizontal portion of the angle bar 1 there is a brace bar 4 that also functions to support the seat 5 through the medium of a resilient strip 6 that has its lower end bent at an angle with respect to its body portion and secured to the brace bar 4 in any appropriate manner.

Figure 4:
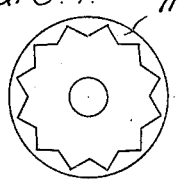
Figure 4 is a detail view of one of the ratchet hub members for the wheels.
Figure 5:
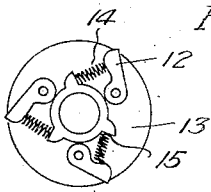
Figure 5 is a similar view of one of the pawl carrying disks that cooperate with the ratchet hub members.

Extending rearwardly from the angle bar 1 adjacent the ends thereof are angle connecting pieces 7 that are formed with elongated bearings 8 through which is passed for rotation therein the axle 9 that has the wheels, one of which is indicated by the reference numeral 10 secured thereto by ratchet means as shown in Figures 4 and 5. The ratchet means includes a hub 11 having teeth providing an internal gear for receiving pawls 12 pivotally secured to a disk 13 that is carried by the axle and these pawls are spring pressed as shown, with the springs 14 engaging the pawls and shoulders 15 formed with a collar on the disk 13 and radiating therefrom.

Figure 2:
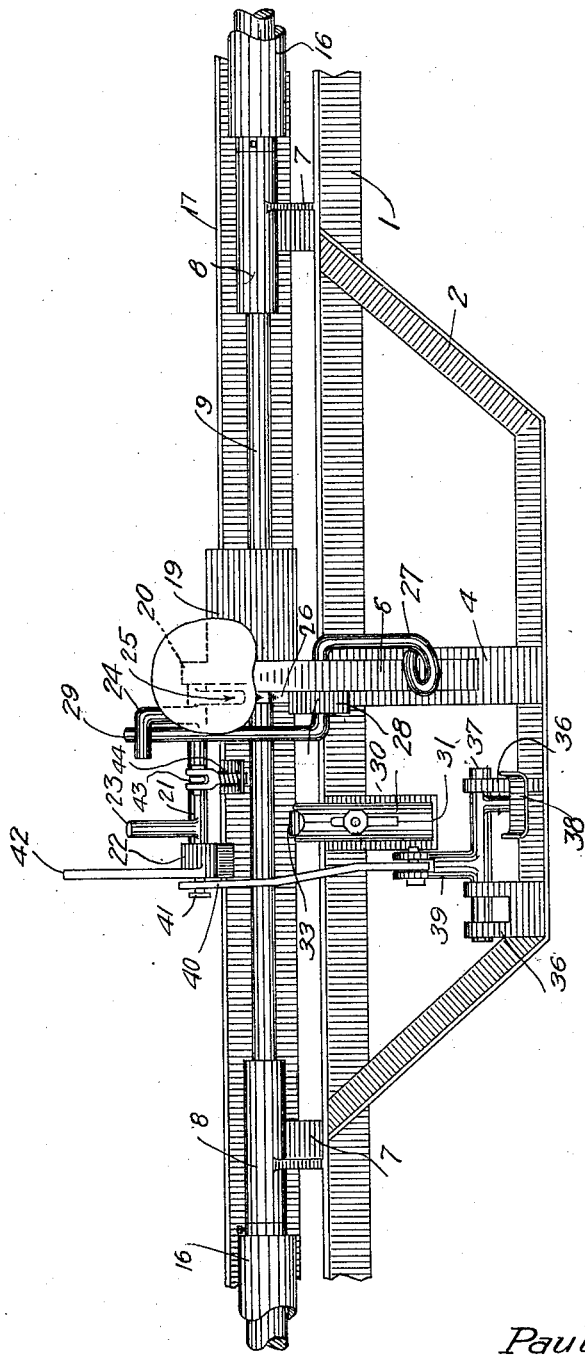
Figure 2 is a top plan view thereof with parts added.
Figure 3:
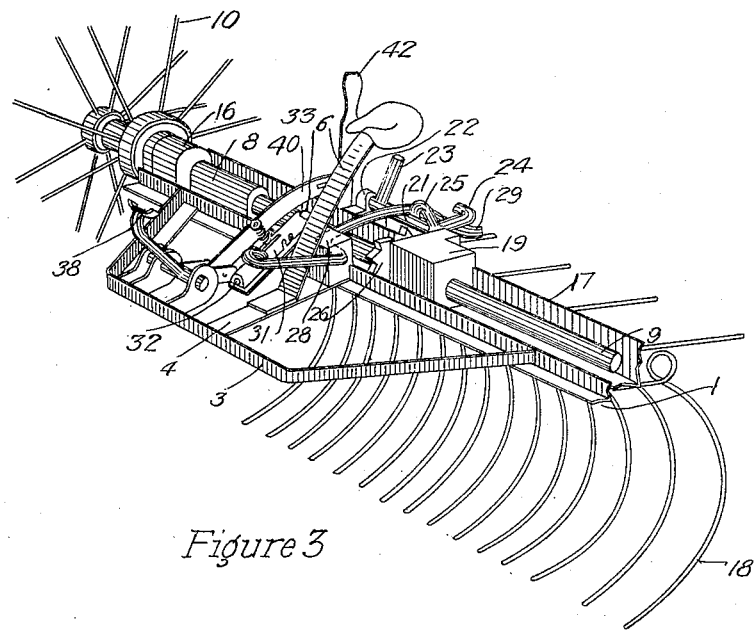
Figure 3 is a view similar to Figure 1, but on a smaller scale with a wheel and rake teeth included.

Surrounding the axle 9 for rotation thereon and disposed adjacent the ends thereof are bearings 16 which are formed with the end portions of a movable angle bar 17 that has secured thereto in spaced parallel relation with respect to each other and in the usual manner a plurality of rake teeth 18. The movable angle bar carries a block 19 that has extending from its rear portion adjacent one side thereof a projection 20 within which is journaled one end of a stub shaft 21, while its opposite end is journaled in a bearing 22 formed with and extending rearwardly from the movable angle bar as best shown in Figure 2. The stub shaft 21